United States Patent
Mitomo

(10) Patent No.: US 12,401,233 B2
(45) Date of Patent: Aug. 26, 2025

(54) ELECTRONIC APPARATUS FOR POWER TRANSFER USING MECHANICAL POWER TRANSFER SCHEME, WIRELESS POWER TRANSFER METHOD, AND WIRELESS POWER TRANSFER SYSTEM

(71) Applicant: KABUSHIKI KAISHA TOSHIBA, Tokyo (JP)

(72) Inventor: Toshiya Mitomo, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 26 days.

(21) Appl. No.: 18/182,027

(22) Filed: Mar. 10, 2023

(65) Prior Publication Data
US 2024/0039343 A1 Feb. 1, 2024

(30) Foreign Application Priority Data
Jul. 27, 2022 (JP) ................. 2022-119879

(51) Int. Cl.
| | | |
|---|---|---|
| *H02J 50/00* | (2016.01) | |
| *H02J 50/20* | (2016.01) | |
| *H02J 50/80* | (2016.01) | |
| *H04B 5/79* | (2024.01) | |

(52) U.S. Cl.
CPC ............. *H02J 50/80* (2016.02); *H02J 50/20* (2016.02); *H04B 5/79* (2024.01)

(58) Field of Classification Search
None
See application file for complete search history.

(56) References Cited

U.S. PATENT DOCUMENTS

| | | | |
|---|---|---|---|
| 7,936,095 B2 | 5/2011 | Kawabata | |
| 9,800,060 B2 * | 10/2017 | Shimokawa | ............ H02J 50/90 |
| 11,804,875 B2 | 10/2023 | Murata et al. | |
| 12,107,437 B2 | 10/2024 | Hamana et al. | |

(Continued)

FOREIGN PATENT DOCUMENTS

| | | |
|---|---|---|
| CN | 114256994 | 3/2022 |
| JP | H8-130840 A | 5/1996 |

(Continued)

OTHER PUBLICATIONS

Kazuki Arai et al., "A Tile-based 8×8 Triangular Grid Array Beamformer for 5.7 GHz Microwave Power Transmission," 2021 IEEE Radio and Wireless Symposium, pp. 101-104, DOI: 10.1109/RWS50353.2021.9360351 (2021).

(Continued)

*Primary Examiner* — Adi Amrany
(74) *Attorney, Agent, or Firm* — Finnegan, Henderson, Farabow, Garrett & Dunner, LLP

(57) ABSTRACT

According to one embodiment, an electronic apparatus capable of transferring power wirelessly to a power receiver apparatus, apparatus includes: a signal generation circuitry configured to generate a first signal for wireless power transfer; an antenna configured to radiate an electromagnetic wave on a basis of the first signal; an actuator capable of mechanically changing an orientation of the antenna; and a controlling circuitry configured to control a transmission power of the first signal according to the orientation of the antenna.

17 Claims, 13 Drawing Sheets

(56) References Cited

U.S. PATENT DOCUMENTS

| | | | |
|---|---|---|---|
| 12,191,678 B2 | 1/2025 | Taniguchi et al. | |
| 2006/0273756 A1* | 12/2006 | Bowling | B60L 53/68 |
| | | | 320/107 |
| 2010/0217353 A1* | 8/2010 | Forsell | H02J 50/80 |
| | | | 607/61 |
| 2012/0188917 A1* | 7/2012 | Knox | H01Q 1/2225 |
| | | | 370/277 |
| 2015/0001959 A1* | 1/2015 | Shimokawa | H02J 50/10 |
| | | | 307/104 |
| 2021/0184728 A1* | 6/2021 | Kang | H04B 5/266 |
| 2021/0328460 A1* | 10/2021 | Kuroda | G05D 1/0088 |

FOREIGN PATENT DOCUMENTS

| | | |
|---|---|---|
| JP | 2007-267110 A | 10/2007 |
| JP | 2008-92704 A | 4/2008 |
| JP | 2010-258846 A | 11/2010 |
| JP | 2013-132134 A | 7/2013 |
| JP | 6512722 B2 | 5/2019 |
| JP | 2020-14154 A | 1/2020 |
| JP | 2021-125983 A | 8/2021 |
| JP | 2021-151061 A | 9/2021 |

OTHER PUBLICATIONS

Japanese Patent Office, Office Action in JP Application No. 2022-119879 (Jun. 3, 2025).

* cited by examiner

ELECTRONIC APPARATUS FOR POWER TRANSFER USING MECHANICAL POWER TRANSFER SCHEME, WIRELESS POWER TRANSFER METHOD, AND WIRELESS POWER TRANSFER SYSTEM

CROSS REFERENCE TO RELATED APPLICATIONS

This application is based upon and claims the benefit of priority from the prior Japanese Patent Application No. 2022-119879, filed on Jul. 27, 2022, the entire contents of which are incorporated herein by reference.

FIELD

Embodiments herein related to an electronic apparatus, a wireless power transfer method, and a wireless power transfer system.

BACKGROUND

There is a method of transferring power by microwaves with maximum efficiency to a receiver target placed at a given location through beamforming with an array antenna. Known beamforming methods include beamforming by digital control and beamforming by analog control.

However, to perform beamforming, a transmitter circuit and a receiver circuit that can handle a large number of antenna elements are necessary, which increases component costs and implementation costs. One method of addressing this problem is a mechanical power transfer scheme in which a motor or the like is used to control the elevation angle and the azimuth angle (rotation angle) of a high-gain antenna. By adopting this method, a beamforming device is no longer necessary and costs are reduced.

In the case of power transfer by microwaves, a situation in which another wireless system exists nearby is anticipated. In a mixed situation of a power transfer system and another wireless system, a problem occurs in that if the power transfer apparatus handles high power, coexistence with the other wireless system may be difficult with the mechanical power transfer scheme.

That is, in the case of the electronic beamforming scheme described above, the maximum directivity is determined according to the directivity of individual antennas (e.g., patch antennas) forming an array antenna. For this reason, it is also possible to form a beam that suppresses radiation in an undesired direction (for example, a direction horizontal to the installation surface of the power transfer apparatus or a direction parallel to the ground). Consequently, high-power signal leakage to another wireless system on a neighboring frequency band can be reduced, even if the other wireless system is installed outside the power transfer area of the power transfer apparatus. Accordingly, coexistence and co-use with another wireless system is easy.

On the other hand, in the case of the mechanical power transfer scheme, since the elevation angle of the antenna itself is changed to control the beam direction, the maximum directivity is always determined by the orientation of the antenna, independent of the elevation angle. Consequently, depending on the elevation angle, radiation in an undesired direction cannot be suppressed. For example, high-power leakage can occur if the main lobe is directed in the undesired direction, and even if the main lobe is not directed in the undesired direction, high-power leakage due to side lobes can still occur in the undesired direction. Therefore, coexistence with another wireless system that exists outside the power transfer area is difficult.

DETAILED DESCRIPTION

According to one embodiment, an electronic apparatus capable of transferring power wirelessly to a power receiver apparatus, apparatus includes: a signal generation circuitry configured to generate a first signal for wireless power transfer; an antenna configured to radiate an electromagnetic wave on a basis of the first signal; an actuator capable of mechanically changing an orientation of the antenna; and a controlling circuitry configured to control a transmission power of the first signal according to the orientation of the antenna.

Hereinafter, embodiments of the present invention will be described with reference to the drawings.

First Embodiment

Figure 1:
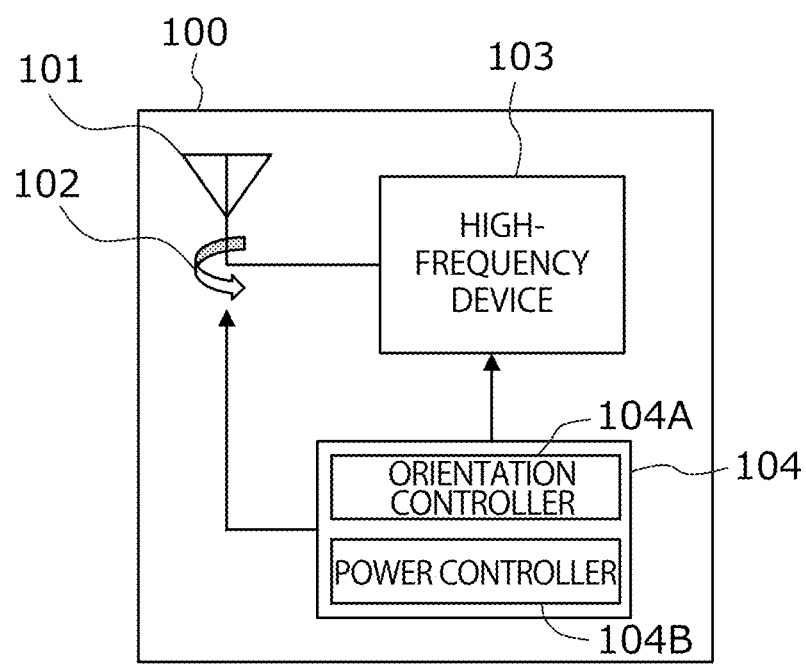
FIG. 1 is a block diagram illustrating an example of a microwave power transfer apparatus according to a first embodiment.

FIG. 1 is a block diagram illustrating an example of a microwave power transfer apparatus 100 as an electronic apparatus or a wireless power transfer apparatus according to a first embodiment.

Figure 2:
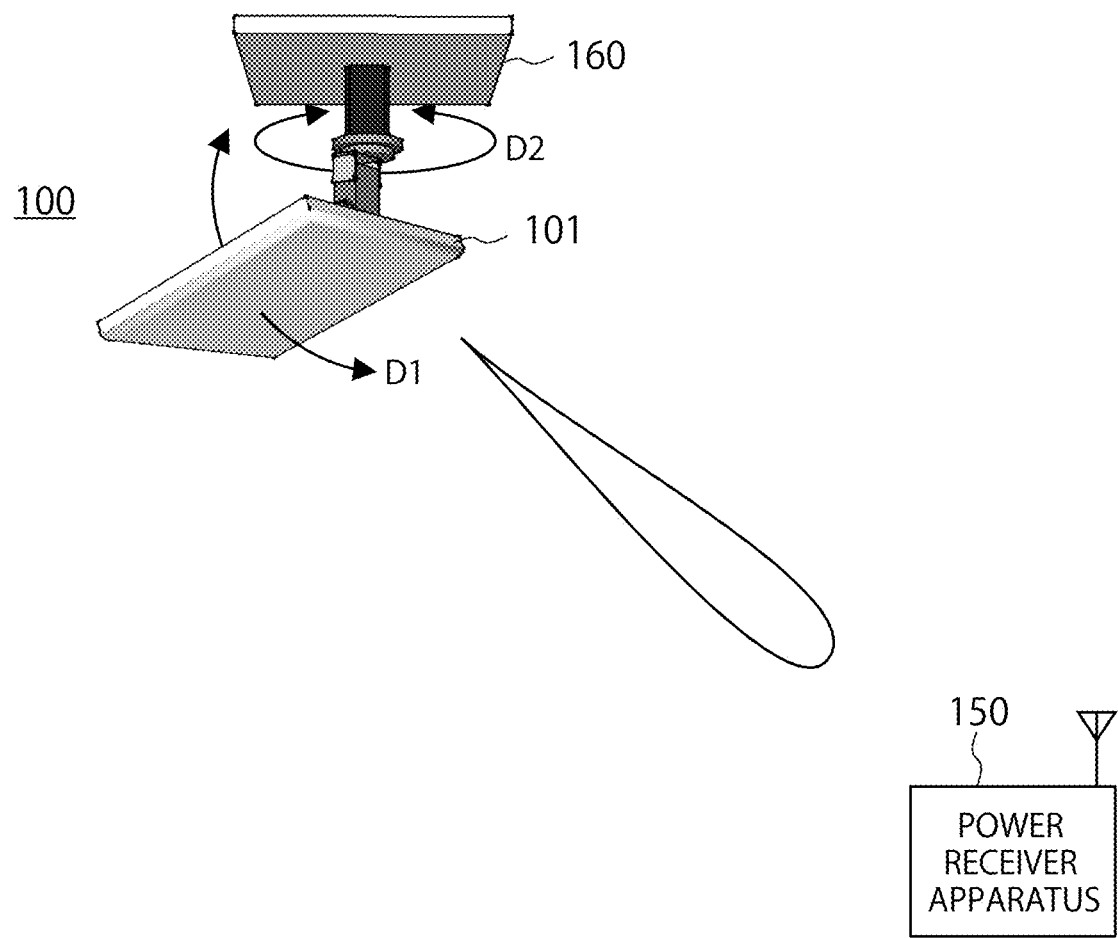
FIG. 2 is a diagram illustrating an installation example of the microwave power transfer apparatus in FIG. 1.

FIG. 2 illustrates an installation example of the microwave power transfer apparatus 100 in FIG. 1. The microwave power transfer apparatus 100 is installed on a side (back) surface of a ceiling 160. The microwave power transfer apparatus 100 is an apparatus that transfers power wirelessly to a power receiver apparatus 150 by using the mechanical power transfer scheme. The orientation of the antenna 101 can be changed in at least an elevation angle direction D1 from among the elevation direction D1 and an azimuth angle direction D2. Hereinafter, the direction opposite the ceiling 160 (the direction to the ground) may be referred to as downward in some cases. The installation location of the microwave power transfer apparatus 100 is not limited to the ceiling and may also be on a ground surface or any other location.

As illustrated in FIG. 1, the microwave power transfer apparatus 100 is provided with an antenna 101, a high-frequency device 103 (signal generator or signal generation circuitry), a mechanical elevation angle controller 102 (actuator), and a controller 104.

The high-frequency device 103 (signal generator) generates a signal (power transfer signal or first signal) for wireless power transfer to the power receiver apparatus 150. The generated power transfer signal is supplied to the antenna 101. In one example, the power transfer signal is a high-frequency analog signal. The high-frequency device 103 generates the power transfer signal by amplifying a local signal produced by a local oscillator, for example. Before amplification, the local signal may be frequency-converted, and the frequency-converted signal may also be subject to bandwidth control using a filter.

The mechanical elevation angle controller 102 (actuator) is a device which is connected to the antenna 101 and which can mechanically change the elevation angle from among and the elevation angle and the azimuth angle that define the orientation of the antenna 101. The present embodiment deals with the case of changing the elevation angle as the orientation of the antenna 101, but the case of changing the azimuth angle is dealt with in another embodiment.

The controller 104 is a controlling circuitry including an orientation controller 104A and a power controller 104B (a power control circuit). The controller 104 may be configured by using a circuit such as an application-specific integrated circuit (ASIC) or a field-programmable gate array (FPGA), or by using a processor. Alternatively, some or all of these elements may be executed by a CPU that runs a program.

The orientation controller 104A is connected to the mechanical elevation angle controller 102 and changes the elevation angle of the antenna 101 by controlling the mechanical elevation angle controller 102. The orientation controller 104A controls the elevation angle of the antenna 101 by sending a command value specifying an elevation angle for the antenna 101 to the mechanical elevation angle controller 102. The mechanical elevation angle controller 102 changes the elevation angle of the antenna 101 according to the command value. Information about the elevation angle to be set in the antenna 101 may also be set in advance. Alternatively, the orientation controller 104A may acquire information about the elevation angle to be set in the antenna 101 from a user of the microwave power transfer apparatus 100 through an input interface (not illustrated) provided in the microwave power transfer apparatus 100. Alternatively, information indicating the elevation angle to be set in the antenna 101 may be acquired from a user terminal operated by the user.

The power controller 104B is connected to the high-frequency device 103 and controls the transmission power (output power) of the power transfer signal generated by the high-frequency device 103 according to information about the elevation angle set in the antenna 101. Control of the transmission power includes controlling the gain or attenu-ation of the high-frequency device 103. The power controller 104B controls the transmission power of the power transfer signal by sending a command value specifying the gain or attenuation, or alternatively the output power value or the like, to the high-frequency device 103. In this way, by controlling the transmission power of the power transfer signal according to the elevation angle of the antenna 101, the radiation pattern of electromagnetic waves radiated from the antenna 101 is controlled so as not to exceed an allowed value in an undesired direction (for example, the horizontal direction), irrespectively of the orientation of the antenna 101. In one example, if the undesired direction is the horizontal direction, the maximum output value is $\frac{1}{100}$ the maximum radiation level. This value may be set in the specifications. The undesired direction is the direction parallel to the installation surface of the microwave power transfer apparatus, for example.

The antenna 101 is an antenna that has a radiation pattern having a specific directivity in the direction in which the antenna 101 faces. For example, maximum directivity is obtained in the direction that the antenna 101 faces. For example, when the antenna 101 is directed with an elevation angle of 0 degrees (downward), there is formed a radiation pattern having a directivity in which the maximum gain is downward. If the magnitude of the transmission power is the same, each radiation pattern generally has the same shape and size, irrespectively of the orientation of the antenna 101. When the antenna 101 is directed with an elevation angle of 30 degrees (diagonally left downward), there is formed a radiation pattern having a directivity in which the maximum gain is diagonally left downward. The antenna 101 is connected to the high-frequency device 103, receives the power transfer signal from the high-frequency device 103, and radiates electromagnetic waves into space with the above-described directivity. The antenna 101 includes an antenna element that radiates electromagnetic waves. The power receiver apparatus 150 can receive a transfer of power by receiving radiated electromagnetic waves. By controlling the elevation angle and the like of the antenna 101 with the mechanical elevation angle controller 102, it is possible to transfer power to any power receiver apparatus, including the power receiver apparatus 150.

In this way, by controlling the transmission power of the power transfer signal according to the elevation angle of the antenna 101, electromagnetic wave leakage exceeding an allowed value in an undesired direction can be prevented regardless of the antenna orientation, even in the case of a mechanical power transfer control (or elevation angle control) scheme in which the orientation of the antenna 101 and the orientation of maximum directivity exist in a 1-to-1 correspondence. Hereinafter, FIGS. 3 and 4 will be used to provide a more detailed description.

Figure 3A:
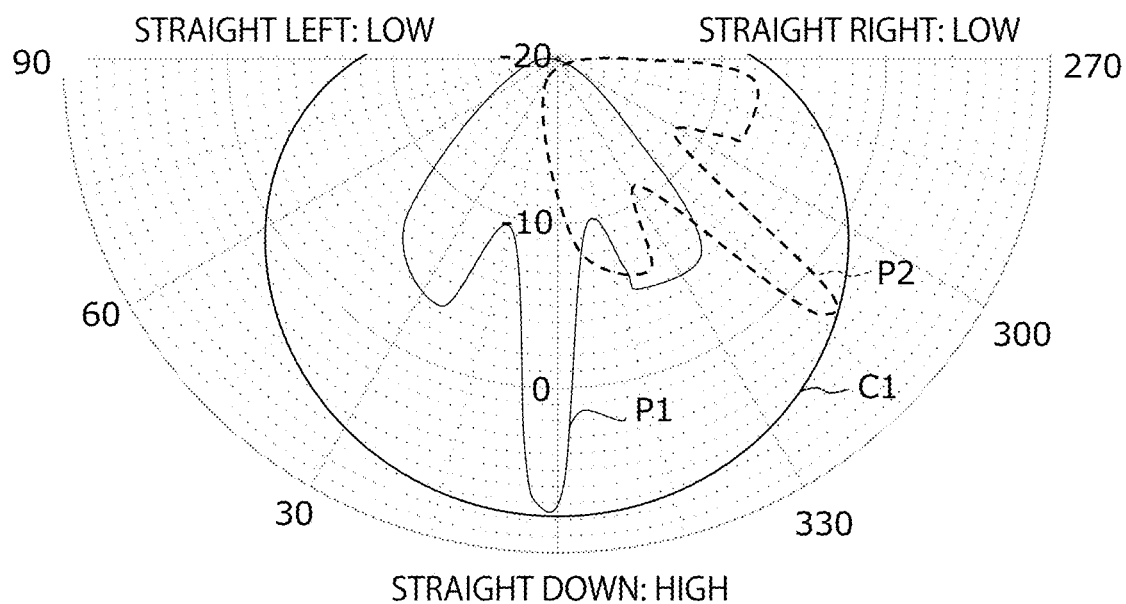
FIGS. 3A and 3B illustrate elevation angle-maximum output characteristics when electronic beamforming is performed.
Figure 3B:
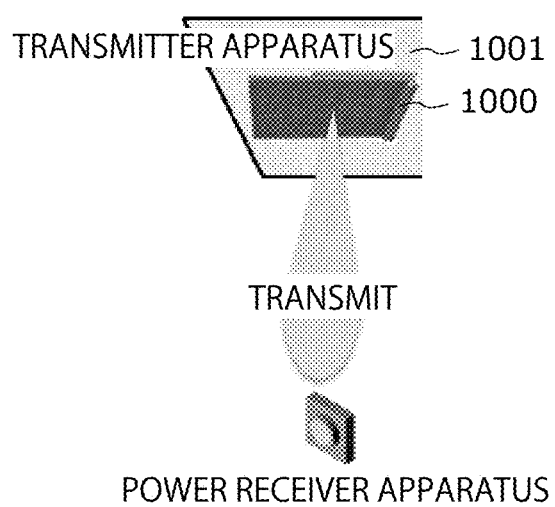

FIG. 3A illustrates maximum output characteristics C1 for each elevation angle in the case of performing electronic beamforming with an array antenna that serves as a first comparative example. FIG. 3B schematically illustrates a situation in which a beam is transmitted (a power transfer signal is transmitted) straight downward by electronic beamforming. A power transfer apparatus 1000 is installed on a ceiling 1001.

Figure 4A:
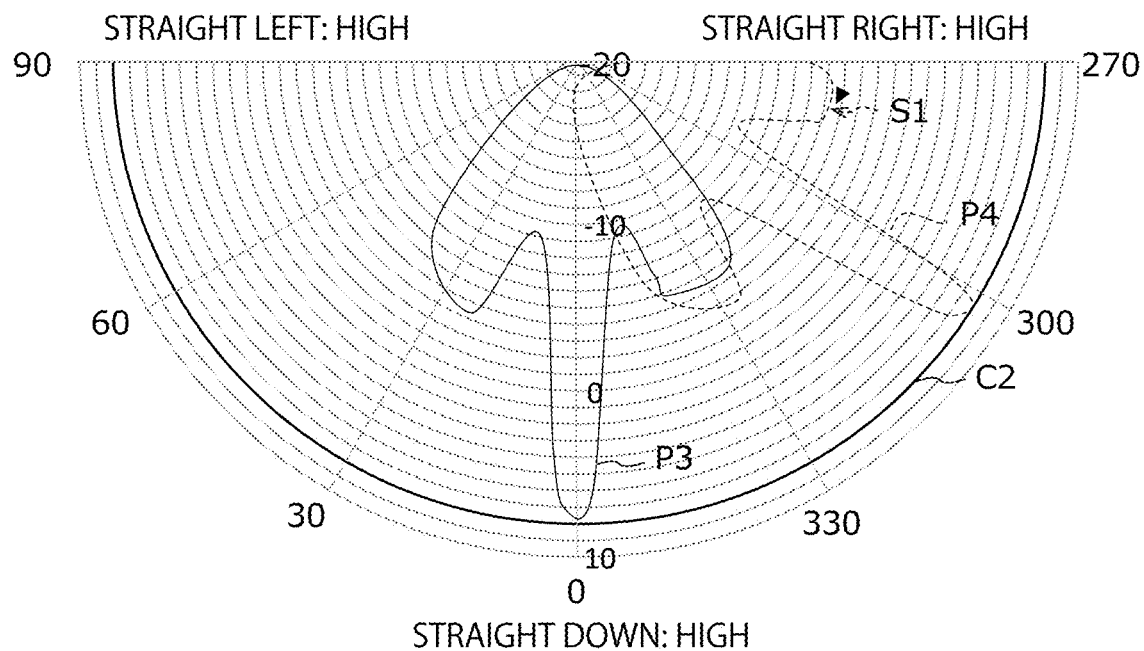
FIGS. 4A and 4B illustrate elevation angle-maximum output characteristics when the mechanical power transfer scheme is employed.
Figure 4B:
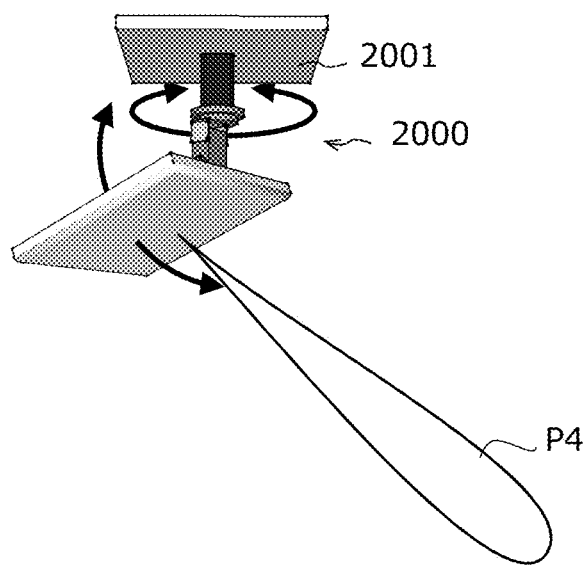

FIG. 4A illustrates maximum output characteristics C2 for each elevation angle in the case of performing power transfer according to another mechanical power transfer control (or elevation angle control) scheme that serves as a second comparative example. FIG. 4B schematically illustrates a situation in which a beam is transmitted (a power transfer signal is transmitted) in the direction of approximately 305 degrees according to the power transfer control of the other mechanical power transfer control scheme.

In the electronic beamforming scheme, the maximum directivity is determined according to the directivity of individual antennas (for example, patch antennas) forming an array antenna in the power transfer apparatus 1000. Accordingly, by adjusting the directivity of the individual antennas (the weighting of the signals for the antennas), the desired elevation angle-output characteristics C1, like those illustrated in FIG. 3A for example, are obtained easily. In other words, with electronic beamforming, it is also easy to point the maximum directivity in any direction to satisfy the maximum output characteristics C1 illustrated in FIG. 3A. By satisfying the maximum output characteristics C1, interference with another wireless system is mitigated, and coexistence with the other wireless system is easy.

For example, in the case of transmitting a beam straight downward (0 degrees) from the power transfer apparatus 1000 installed on the ceiling 1001 as in FIG. 3B, a radiation pattern P1 is obtained. Also, in the case of transmitting a beam in the direction of approximately 314 degrees, the result satisfies the maximum output characteristics C1 and a radiation pattern P2 is obtained. Neither the main lobe nor the side lobes of the radiation patterns P1 and P2 exceed the maximum value (allowed value) indicated by the maximum output characteristics C1.

With the maximum output characteristics C1 in FIG. 3A, the maximum output value is smallest in the horizontal direction of the installation surface of the power transfer apparatus 1000 or the direction parallel to the ground, which correspond to the undesired direction. The radiation pattern can be controlled so that no matter which direction a beam is transmitted in, neither the main lobe nor the side lobes have a maximum output value in the horizontal direction that exceeds the output value indicated by the maximum output characteristics C1. With this configuration, radiation in the horizontal direction can be suppressed. Accordingly, high-power signal leakage to another wireless system on a neighboring frequency band installed outside the power transfer area of the power transfer apparatus can be reduced, and therefore coexistence and co-use with the other wireless system is easy.

On the other hand, FIG. 4A illustrates the case of another mechanical power transfer control scheme that serves as a second comparative example, in which the maximum directivity is fixed (the maximum output value is the same for all directions). With the mechanical power transfer control scheme, since the elevation angle of the antenna itself is changed to control the beam direction, the maximum directivity is fixed, irrespectively of the elevation angle. For this reason, the maximum output characteristics C2 illustrated in the diagram have a semicircular shape. Thus, since the directivity cannot be attenuated in the horizontal direction treated as the undesired direction, as the beam direction approaches the horizontal direction, high-power leakage due to at least one of the main lobe and the side lobes occurs in the horizontal direction without being attenuated. As a result, interference is imparted to another wireless system existing outside the power transfer area, making coexistence with the other wireless system difficult.

For example, as in FIG. 4B, a radiation pattern P4 in the case of transmitting a beam in the direction of approximately 305 degrees and a radiation pattern P3 in the case of transmitting a beam straight downward (0 degrees) from a power transfer apparatus 2000 installed on a ceiling 2001 both have approximately the same maximum output power, and the shapes of the patterns are also substantially the same.

Since directivity (or directivity attenuation) control in the horizontal direction is unavailable, a side lobe 51 (FIG. 4A) of the radiation pattern P4 has a power value in the horizontal direction that exceeds the allowed value.

In contrast, with the mechanical power transfer control scheme according to the present embodiment, the controller 104 controls the gain, attenuation, or the like of the high-frequency device 103 on the basis of information about the elevation angle of the antenna 101. With this configuration, elevation angle-maximum output characteristics can be achieved such that the maximum output value in the undesired direction does not exceed the allowed value, irrespectively of the elevation angle (orientation) of the antenna 101.

FIG. 5 is a diagram for explaining an example of gain or attenuation control performed by the controller 104.

Figure 5A:
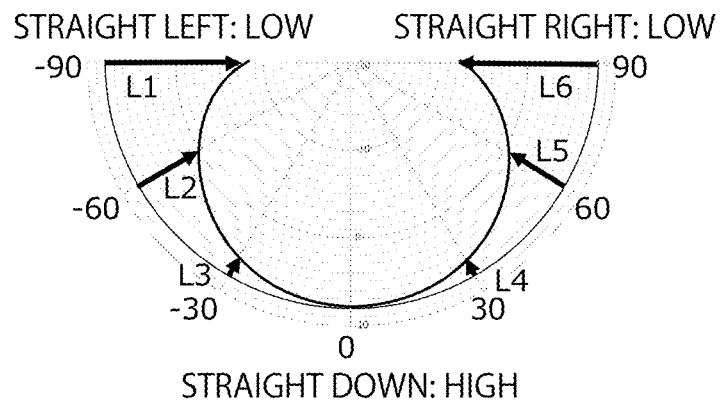
FIGS. 5A and 5B illustrate an example of output control depending on the elevation angle.

FIG. 5A schematically illustrates an example of gain or attenuation control performed by the controller 104. The gain or attenuation of the high-frequency device 103 is controlled (L1 to L6) to make the elevation angle-maximum output characteristics C2 (FIG. 4A) of the mechanical power transfer control in the second comparative example described above match or approach the elevation angle-maximum output characteristics C1 (FIG. 3B) of the electronic beamforming in the first comparative example. With this configuration, the elevation angle-maximum output characteristics C2 are modified. With the mechanical power transfer control in the second comparative example, the elevation angle-maximum output characteristics do not change depending on the elevation angle, but in the present embodiment, the gain or attenuation of the high-frequency device 103 is controlled according to the elevation angle such that the elevation angle-maximum output characteristics are the same or similar to those of the electronic beamforming in the first comparative example. According to the elevation angle-maximum output characteristics, for example, if the maximum output of the main lobe in the radiation pattern for any elevation angle direction is less than or equal to the maximum value of the maximum output characteristic in that elevation angle direction, the maximum output of the side lobes will also satisfy the elevation angle-maximum output characteristics.

Figure 5B:
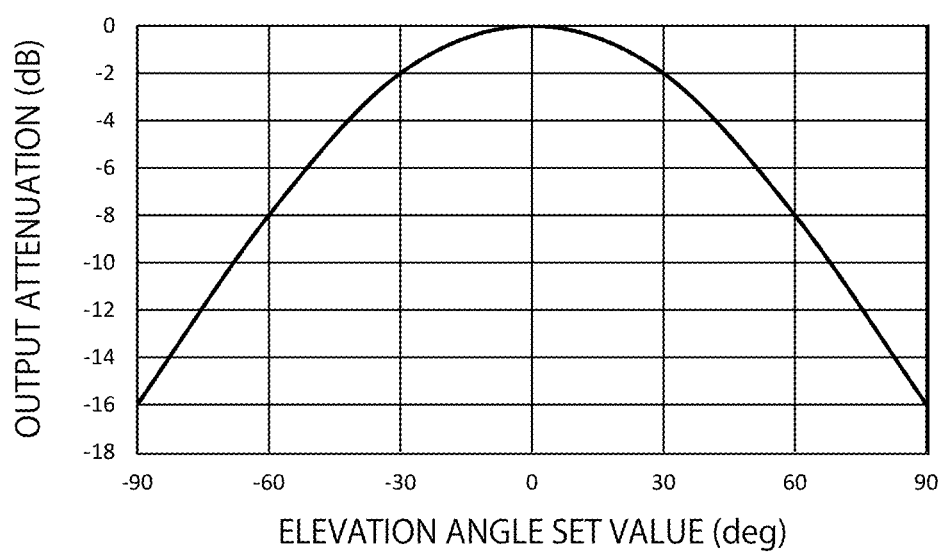

FIG. 5B illustrates a plot of a specific example of the control of the gain or attenuation. The horizontal axis is the elevation angle of the antenna 101, while the vertical axis is the attenuation. The attenuation is zero straight downward, and the attenuation increases as the elevation angle of the antenna 101 approaches the horizontal direction going both ways (−90 degrees (270 degrees), 90 degrees). That is, the maximum output when transferring power at each elevation angle is controlled to be the value of the maximum output characteristics C1.

In this way, by controlling the attenuation according to the value of the elevation angle, electromagnetic leakage in the horizontal direction can also be reduced in the mechanical power transfer control scheme, similarly to electronic beamforming. That is, a reduction in electromagnetic leakage in the horizontal direction can be achieved in accordance with the actual usage environment.

The plot in FIG. 5B is an example, and it is not strictly necessary to obey this plot. For example, a null (or notch) portion of extremely low power gain may exist between the main lobe and the side lobes, or between side lobes, of the radiated electromagnetic waves. Accordingly, when this portion is pointed in the undesired direction (for example, the horizontal direction), a reduction in electromagnetic leakage in the horizontal direction may be attained in some cases, even if the attenuation is smaller compared to the case of obeying the plot in FIG. 5B. That is, the plot (or elevation angle-maximum output characteristics) in FIG. 5B may be thought of as stipulating the maximum power value for each direction when the main lobe is pointed in that direction. For example, in the case of the horizontal direction, the maximum power value in the horizontal direction is stipulated for when the main lobe is pointed in the horizontal direction. Consequently, in cases in which the low portion described above is pointed in the horizontal direction and the main lobe is pointed in another direction, even if the main lobe is at the maximum value according to the plot, the low portion is marginally below the maximum output value in the horizontal direction. Consequently, in this case, it is also possible to increase the maximum output value of the main lobe over the case of obeying the plot. However, this assumes that the low portion does not exceed the maximum output value in the horizontal direction in the above plot (or elevation angle-maximum output characteristics). This configuration enables power transfer at high power, improving the power transfer efficiency.

Figure 6:
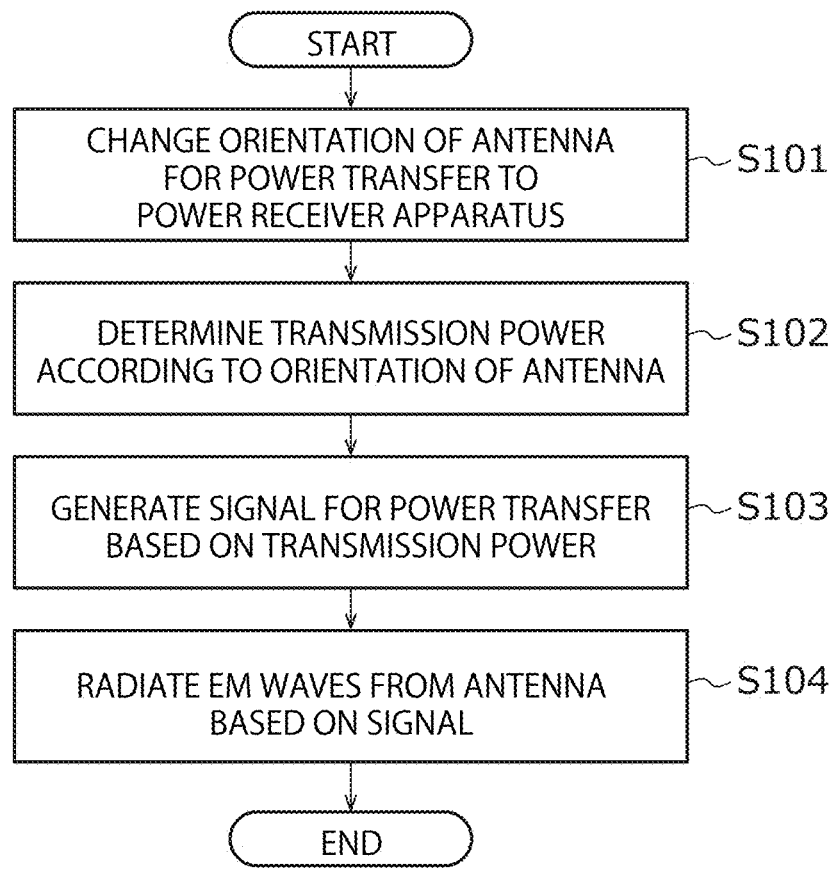
FIG. 6 is a flowchart of an example of operations performed by the microwave power transfer apparatus according to an embodiment.

FIG. 6 is a flowchart of an example of operations performed by the microwave power transfer apparatus 100 according to the present embodiment. The operations correspond to an example of a wireless power transfer method according to the present embodiment. The controller 104 changes, via the actuator 102, the orientation of the antenna 101 relative to the power receiver apparatus 150 (S101). The controller 104 determines the transmission power of the signal for power transfer (first signal) according to the orientation of the antenna 101 (S102). The high-frequency device 103 generates the signal for power transfer on the basis of the determined transmission power (S103). The antenna 101 receives the generated signal and radiates electromagnetic waves into space. The maximum directivity of the radiation pattern is determined by the orientation of the antenna 101 (mechanical power transfer control scheme), but the size of the radiation pattern varies depending on the transmission power. Accordingly, the leakage of power exceeding the allowed value in the undesired direction due to the orientation of the antenna 101 can be prevented.

As above, according to the present embodiment, by controlling the transmission power of a high-frequency signal according to the elevation angle of the antenna 101, the leakage of electromagnetic waves in an undesired direction (for example, the horizontal direction) can be reduced, even in the case of enacting a mechanical power transfer control. With this configuration, the influence on another wireless system existing in the horizontal direction can be reduced with a simple configuration. Thus, coexistence and co-use with another wireless system in the case of using the mechanical power transfer control scheme is easy.

Second Embodiment

Figure 7:
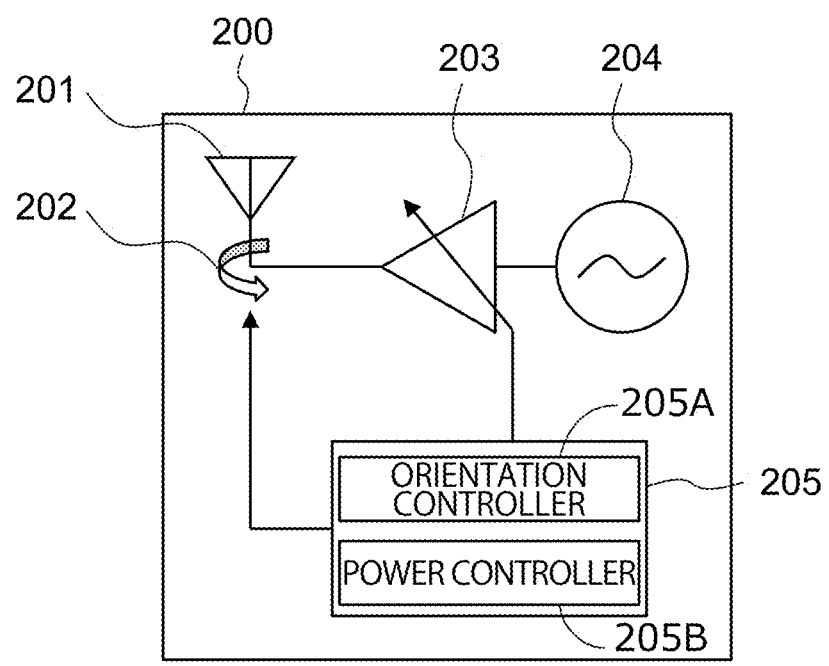
FIG. 7 is a block diagram illustrating an example of a microwave power transfer apparatus according to a second embodiment.

FIG. 7 is a block diagram illustrating an example of a microwave power transfer apparatus 200 as an electronic apparatus according to a second embodiment. The microwave power transfer apparatus 200 is provided with an antenna 201, a mechanical elevation angle controller 202 (actuator), a variable gain amplifier/variable attenuator 203, a high-frequency oscillator 204 (signal generator), and a controller 205. The microwave power transfer apparatus 200 is a specific implementation of the high-frequency device 103 of the microwave power transfer apparatus 100 in FIG. 1. The antenna 201, the mechanical elevation angle controller 202, and an orientation controller 205A in the controller 205 have the same functions as the antenna 101, the mechanical elevation angle controller 102, and the orientation controller 104A in the first embodiment, and therefore a description is omitted. Hereinafter, the differences from the first embodiment will be described mainly, whereas the description that is the same for the first and second embodiments will be omitted, as appropriate.

The high-frequency oscillator 204 is an oscillator that generates a high-frequency signal on a fixed frequency. The high-frequency oscillator 204 supplies the generated high-frequency signal to the variable gain amplifier/variable attenuator 203.

The variable gain amplifier/variable attenuator 203 includes at least one of a variable gain amplifier and a variable attenuator, or a set of a variable gain amplifier and a variable attenuator.

The controller 205 includes an orientation controller 205A and a power controller 205B. The power controller 205B controls the gain/attenuation of the variable gain amplifier/variable attenuator 203 according to information about the elevation angle set in the antenna 201. The method of control is similar to the first embodiment.

The variable gain amplifier/variable attenuator 203 amplifies the high-frequency signal supplied from the high-frequency oscillator 204 on the basis of a gain/attenuation set by the power controller 205B. The amplified high-frequency signal is supplied to the antenna 201 as the power transfer signal, and electromagnetic waves are radiated from the antenna 201 by mechanical beamforming. The radiated electromagnetic waves are received by the power receiver apparatus 150 (see FIG. 2), thereby transferring power to the power receiver apparatus 150.

As above, according to the present embodiment, the gain/attenuation of the variable gain amplifier/variable attenuator 203 is controlled according to the elevation angle of the antenna 101. With this configuration, the transmission power can be controlled with a simple configuration.

Third Embodiment

Figure 8:
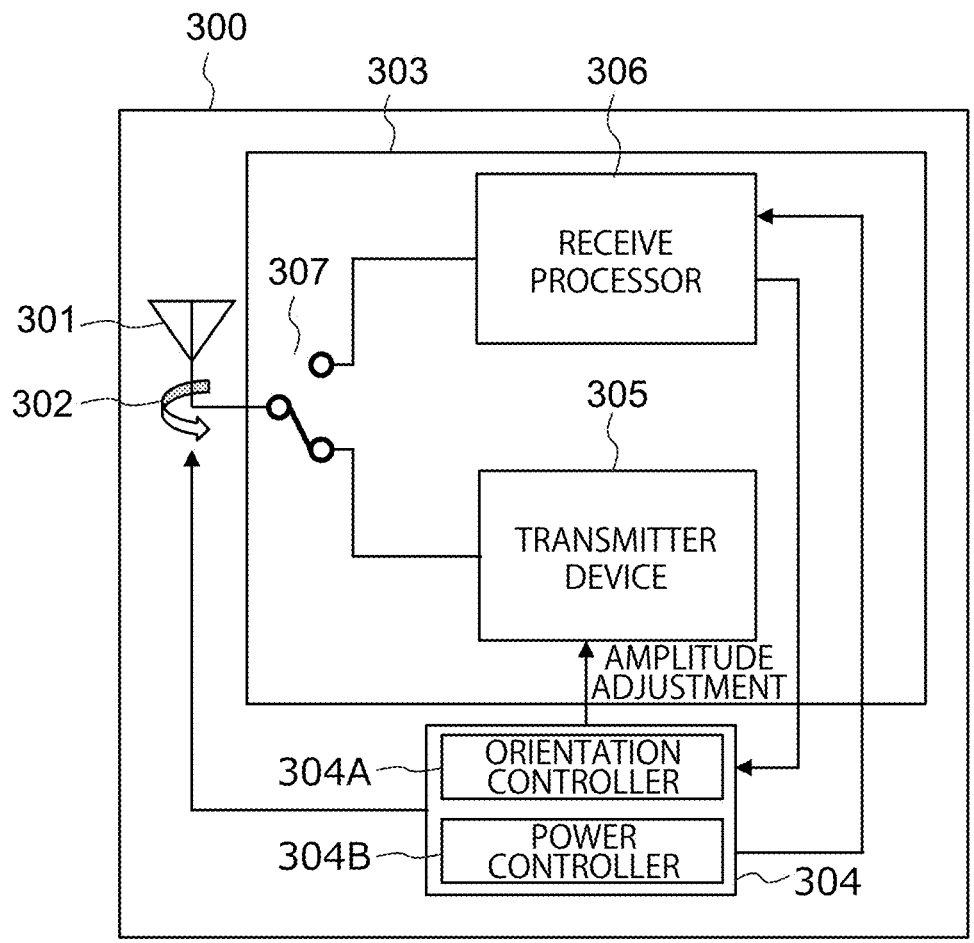
FIG. 8 is a block diagram illustrating an example of a microwave power transfer apparatus according to a third embodiment.

FIG. 8 is a block diagram illustrating an example of a microwave power transfer apparatus 300 as an electronic apparatus according to a third embodiment.

The microwave power transfer apparatus 300 is provided with an antenna 301, a mechanical elevation angle controller 302 (actuator), a high-frequency device 303, and a controller 304. The antenna 301 and the mechanical elevation angle controller 302 have the same functions as the antenna 101 and the mechanical elevation angle controller 102 in the first embodiment, and therefore a description is omitted. Hereinafter, the differences from the first and second embodiments will be described mainly, whereas the description that is the same as the first and second embodiments will be omitted, as appropriate.

The high-frequency device 303 is provided with a transmitter device 305, a receive processor 306 (receive processing circuitry), and a switch 307.

The transmitter device 305 has functions similar to the high-frequency device 103 (see FIG. 1) of the first embodiment. Alternatively, the transmitter device 305 has functions similar to the variable gain amplifier/variable attenuator 203 and the high-frequency oscillator 204 in FIG. 7.

The switch 307 includes a switch that selectively connects the antenna 301 to the receive processor 306 or the transmitter device 305. The switch 307 receives instruction information specifying the connection destination from the controller 304, and switches the connection destination in accordance with the instruction information.

The receive processor 306 has a carrier sense function that detects whether another wireless system using the same or a neighboring frequency to the frequency used by the microwave power transfer apparatus 300 exists nearby. The receive processor 306 compares the receive power level of a signal (second signal) received through the antenna 301 to a threshold value. The receive processor 306 detects that another wireless system exists if the receive power level is equal to or greater than the threshold value, and detects that another wireless system does not exist if the receive power level is less than the threshold value. The threshold value for carrier sense can be set or switched by the controller 304. The receive processor 306 sends carrier sense result information to the controller 304.

Note that in the case where an array antenna including multiple antenna elements for reception is provided, the receive processor 306 may also estimate a channel with the power receiver apparatus 150 by receiving beacon signals transmitted periodically from the power receiver apparatus 150, the number of beacon signals being equal to the number of elements in the array antenna. In this case, the receive processor 306 may also estimate the direction in which the power receiver apparatus 150 exists, on the basis of the result of the channel estimation. The receive processor 306 may also send direction information indicating the estimated result to the controller 304.

The controller 304 includes an orientation controller 304A and a power controller 304B.

The orientation controller 304A determines the elevation angle of the antenna 301 on the basis of the carrier sense result information. For example, the receive processor 306 is made to perform the carrier sense while varying the elevation angle of the antenna 301, and the elevation angle of the antenna 301 is determined to be an angle at which the carrier sense result information does not detect another wireless system. Alternatively, the orientation controller 304A acquires direction information from the receive processor 306, determines the direction of the power receiver apparatus 150 on the basis of the direction information, and determines the elevation angle of the antenna 301 in accordance with the direction of the power receiver apparatus 150. The orientation controller 304A sends information indicating the determined elevation angle to the mechanical elevation angle controller 302, causing the mechanical elevation angle controller 302 to set the elevation angle of the antenna 301. Otherwise, information is sent to the mechanical elevation angle controller 302 on the basis of an elevation angle table set in advance by the user, causing the mechanical elevation angle controller 302 to set the elevation angle of the antenna 301. An elevation angle setting pattern to be used when performing carrier sense while varying the elevation angle of the antenna 301 may also be stored in the elevation angle table.

The power controller 304B controls the transmission power of the power transfer signal according to a method similar to the first or second embodiment. In addition, the power controller 304B determines the threshold value for carrier sense performed by the receive processor 306 according to the elevation angle determined by the orientation controller 304A. In one example, the larger the elevation angle is, the larger the value of the threshold value is set. For instance, a first threshold value is determined for the case in which the elevation angle of the antenna points in a first direction, and a second threshold value greater than the first threshold value is determined for the case in which the elevation angle of the antenna points in a second direction closer to the horizontal direction than the first direction. In other words, in this case, the receive processor 306 uses the first threshold value when the elevation angle of the antenna points in a first direction, and uses the second threshold value greater than the first threshold value when the elevation angle of the antenna points in the second direction closer to the horizontal direction than the first direction. The power controller 304B may also determine a threshold value corresponding to the elevation angle determined by the orientation controller 304A, on the basis of a table in which elevation angles and threshold values are associated.

The power controller 304B controls power transfer to the power receiver apparatus 150 on the basis of the carrier sense result information from the receive processor 306. For example, power transfer is initiated if, after the elevation angle of the antenna 301 is determined by the orientation controller 304A, the carrier sense result information indicates that another wireless system using the same or a neighboring frequency does not exist nearby. Additionally, after power transfer is initiated, the power transfer is suspended if the carrier sense result information indicates that another wireless system using the same or a neighboring frequency exists nearby.

According to the present embodiment, when using carrier sense to detect the presence or absence of another wireless system on the same or a neighboring frequency, setting a threshold value dependent on the elevation angle of the antenna makes it possible to perform carrier sense with an appropriate (not excessive) receive sensitivity according to the elevation angle. For example, the transmission power from the power transfer apparatus falls as the elevation angle diverges further from 0 degrees (see FIG. 5(B)), but in this case, since the transmission power exerts little influence on the other wireless system, the other wireless system should not be detected by carrier sense that is more sensitive than necessary. In the present embodiment, the threshold value for carrier sense is set according to the elevation angle, and therefore a suspension of power transfer or a change of the elevation angle of the antenna due to unnecessary detection of the other wireless system can be mitigated. Thus, an improvement in the time efficiency of power transfer is possible.

Fourth Embodiment

Figure 9:
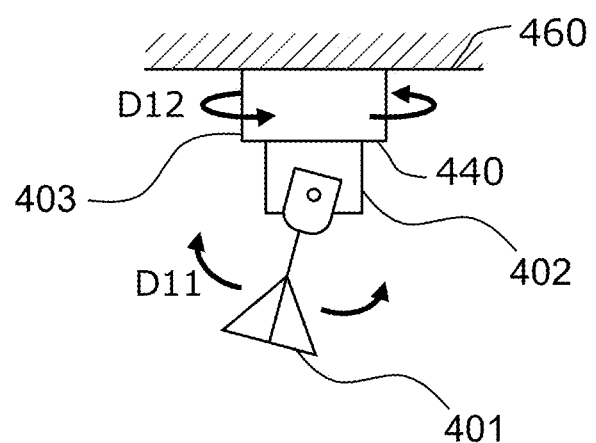
FIG. 9 is a block diagram illustrating an example of a microwave power transfer apparatus according to a fourth embodiment.

FIG. 9 is a diagram illustrating a configuration example of a microwave power transfer apparatus 400 as an electronic apparatus according to a fourth embodiment.

The microwave power transfer apparatus 400 is provided with an antenna 401, a mechanical elevation angle controller 402, and a mechanical rotation angle controller 403. The antenna 401 has the same function as the antenna 101 in the first embodiment. The high-frequency device and controller (orientation controller/power controller) according to any of the first to third embodiments are provided inside the housing of at least one of the mechanical elevation angle controller 402 and the mechanical rotation angle controller 403, or in another location. The mechanical elevation angle controller 402 and the mechanical rotation angle controller 403 correspond to an actuator according to the embodiments. The orientation controller according to the present embodiment can control the elevation angle of the antenna 401 by controlling the mechanical elevation angle controller 402, and can control the azimuth angle of the antenna 401 by controlling the mechanical rotation angle controller 403. The microwave power transfer apparatus 400 is mounted on a ceiling 460.

The mechanical elevation angle controller 402 includes a mover such as a servo motor, and can use the mover to change the orientation of the antenna 401 in an elevation angle direction D11. With this configuration, the elevation angle of the antenna 401 can be changed. Besides a servo motor, a stepping motor or other motor may also be used as the mover. The servo motor may be of any type, such as a DC servo motor, an AC servo motor, a coreless motor, or a DD motor. Note that the case in which the orientation of the antenna 401 is controlled by the user is not ruled out. In this case, information indicating the orientation (elevation angle) to be set may be notified to the user, and the user may adjust the orientation of the antenna 401 manually. In this case, the mechanical elevation angle controller 402 may also be a mechanism supporting the antenna 401 so as to allow the orientation of the antenna 401 to be changed according to manual manipulation by the user. To notify information to the user, a communicator that that communicates with a user terminal may be provided to the microwave power transfer apparatus 400, or a display that displays information may be provided to the microwave power transfer apparatus 400.

The mechanical rotation angle controller 403 includes a mover such as a stepping motor, and can rotate itself to change the orientation of the antenna 401 in an azimuth angle direction (rotation angle direction) D12. With this configuration, the azimuth angle of the antenna 401 can be changed. The mechanical rotation angle controller 403 includes a support 440 supporting the antenna 401 or the mechanical elevation angle controller 402, and can rotate the support to change the orientation of the antenna 401 in the azimuth angle direction D12. Besides a stepping motor, a servo motor or the like may also be used as the mover. The type of stepping motor may be any of the VR, PM, and HB types. Note that the case in which the azimuth angle of the antenna 401 is controlled by the user is not ruled out. In this case, information indicating the orientation (azimuth angle) to be set may be notified to the user, and the user may adjust the azimuth angle of the antenna 401 manually. In this case, mechanical rotation angle controller 403 may also be a mechanism supporting the support 440 so as to allow rotation according to manual manipulation by the user. To notify information to the user, a communicator that that communicates with a user terminal may be provided to the microwave power transfer apparatus 400, or a display that displays information may be provided to the microwave power transfer apparatus 400.

As above, according to the present embodiment, by controlling the azimuth angle of the antenna 401 with the mechanical rotation angle controller 403, radiation in any azimuth angle direction is possible. Moreover, control of the plane of polarization (linear polarization) of the radiated signal is also possible through a combination of an elevation angle and an azimuth angle.

Fifth Embodiment

Figure 10:
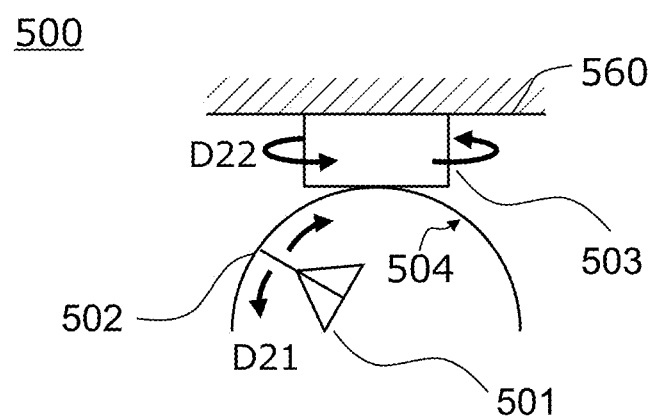
FIG. 10 is a block diagram illustrating an example of a microwave power transfer apparatus according to a fifth embodiment.

FIG. 10 is a diagram illustrating a configuration example of a microwave power transfer apparatus 500 as an electronic apparatus according to a fifth embodiment.

The microwave power transfer apparatus 500 is provided with an antenna 501, a mechanical elevation angle controller 502, and a mechanical rotation angle controller 503. The antenna 501 has the same function as the antenna 101 in the first embodiment. The high-frequency device and controller (orientation controller/power controller) according to any of the first to third embodiments are provided inside the housing of at least one of the mechanical elevation angle controller 502 and the mechanical rotation angle controller 503, or in another location. The mechanical elevation angle controller 502 and the mechanical rotation angle controller 503 correspond to an actuator according to the embodiments. The orientation controller according to the present embodiment can control the elevation angle of the antenna 501 by controlling the mechanical elevation angle controller 502, and can control the azimuth angle of the antenna 501 by controlling the mechanical rotation angle controller 503.

The mechanical elevation angle controller 502 is provided with a mechanism that moves the antenna 501 on an arc-shaped rail 504. The arc-shaped rail 504 is an example of a concave rail, and may also be a rail that is curved or another shape. By controlling the mechanism, the mechanical elevation angle controller 502 can change the elevation angle of the antenna 501 in an elevation angle direction D21. The mechanical rotation angle controller 503 is similar to the mechanical rotation angle controller of the fourth embodiment. The mechanical rotation angle controller 503 can change the orientation of the antenna 501 in an azimuth angle direction D22.

As above, according to the present embodiment, by moving the antenna 501 on the arc-shaped rail 504 to change the elevation angle of the antenna 501, the elevation angle is changed easily, even if the structure of the antenna makes it difficult to control the elevation angle of the antenna with the configuration in FIG. 9 described above. Moreover, by controlling the azimuth angle of the antenna 501 with the mechanical rotation angle controller 503, radiation in any azimuth angle direction is possible. Moreover, control of the plane of polarization (linear polarization) of the radiated signal is also possible through a combination of an elevation angle and an azimuth angle.

Sixth Embodiment

Figure 11:
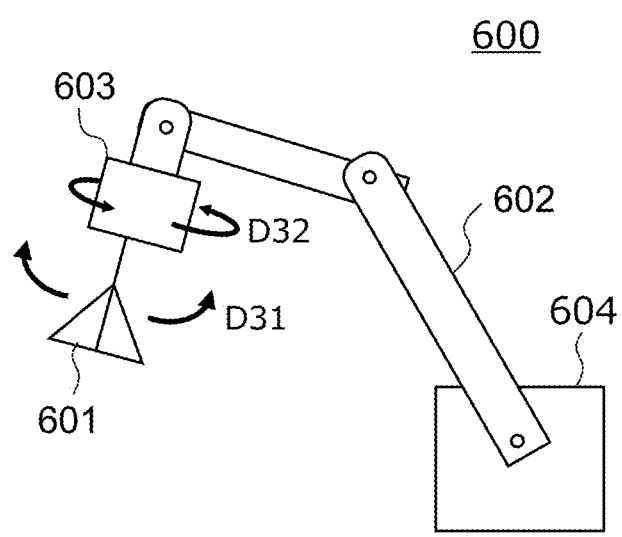
FIG. 11 is a block diagram illustrating an example of a microwave power transfer apparatus according to a sixth embodiment.

FIG. 11 is a diagram illustrating a configuration example of a microwave power transfer apparatus 600 as an electronic apparatus according to a sixth embodiment.

The microwave power transfer apparatus 600 is provided with an antenna 601, a mechanical elevation angle controller 602, and a mechanical rotation angle controller 603. The antenna 601 has the same function as the antenna 101 in the first embodiment. The high-frequency device and controller (orientation controller/power controller) according to any of the first to third embodiments are provided inside the housing of at least one of the mechanical elevation angle controller 602 and the mechanical rotation angle controller 603, or in another location. The mechanical elevation angle controller 602 and the mechanical rotation angle controller 603 correspond to an actuator according to the embodiments. The orientation controller according to the present embodiment can control the elevation angle of the antenna 601 by controlling the mechanical elevation angle controller 602, and can control the azimuth angle of the antenna 601 by controlling the mechanical rotation angle controller 603.

The mechanical elevation angle controller 602 includes a robot arm, and can freely change the elevation angle of the antenna 601 through the driving of the robot arm. One end of the robot arm is connected to a base 604, and the other end of the robot arm is connected to the mechanical rotation angle controller 603.

As above, according to the present embodiment, by using the robot arm, the elevation angle of the antenna 601 can be changed in an elevation angle direction D31, and the antenna 601 can be moved over a wide range. Thus, the area treated as the target of power transfer can be increased. Moreover, by controlling the azimuth angle of the antenna 601 with the mechanical rotation angle controller 603, radiation in any azimuth angle direction D32 is possible. Moreover, control of the plane of polarization (linear polarization) of the radiated signal is also possible through a combination of an elevation angle and an azimuth angle.

Seventh Embodiment

Figure 12:
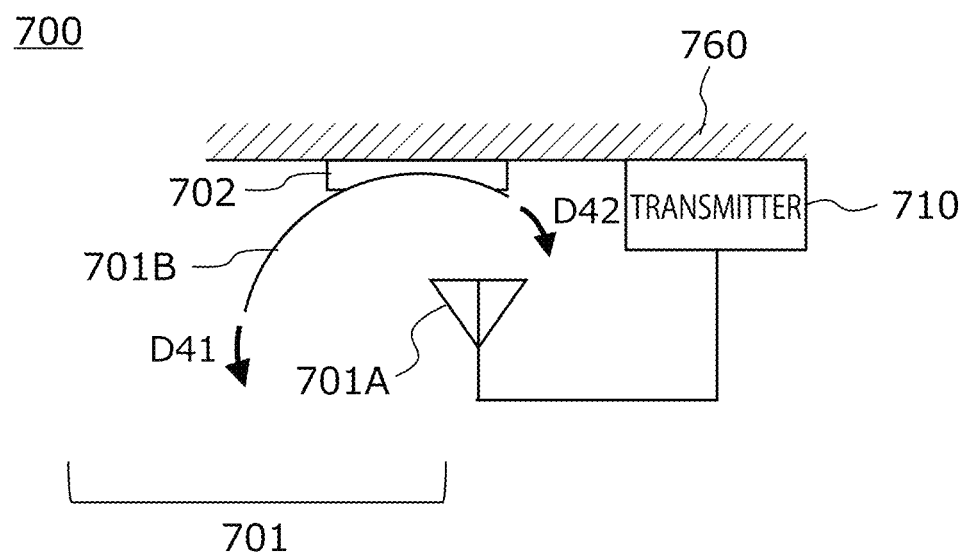
FIG. 12 is a block diagram illustrating an example of a microwave power transfer apparatus according to a seventh embodiment.

FIG. 12 is a diagram illustrating a configuration example of a microwave power transfer apparatus 700 as an electronic apparatus according to a seventh embodiment. The microwave power transfer apparatus 700 is mounted on a ceiling 760.

The microwave power transfer apparatus 700 is provided with an antenna 701 (701A, 701B), a mechanical elevation angle controller 702 (actuator), and a transmitter 710. The transmitter 710 includes the high-frequency device and controller (orientation controller/power controller) according to any of the first to third embodiments.

The antenna 701 includes a radiator (antenna element) 701A that radiates electromagnetic waves and a reflector 701B that faces the radiator 701A and reflects electromagnetic waves radiated from the radiator 701A.

The mechanical elevation angle controller 702 can move the reflector 701B relative to the radiator 701A. For example, the reflector 701B is movable in a left circumferential direction D41 and a right circumferential direction D42. By changing the orientation of the reflector 701B relative to the radiator 701A, it is possible to change the reflection direction of electromagnetic waves radiated from the radiator 701A, that is, the maximum gain direction of the antenna 701 or the radiation direction of the antenna 701. The orientation controller according to the present embodiment moves the reflector 701B by controlling the mechanical elevation angle controller 702. With this configuration, an effect similar to changing the elevation angle of the antenna in the first to sixth embodiments can be obtained. Moving the reflector 701B in this way corresponds to changing the elevation angle in the first to sixth embodiments.

A mechanical rotation angle controller may also be provided as in FIGS. 9 to 11 described above, so that the radiator 701A of the antenna 701 is also rotatable in the azimuth angle direction.

As above, according to the present embodiment, even if the structure of the antenna makes it difficult to change the elevation angle, by using the antenna as the radiator 701A and using the reflector 701B to reflect electromagnetic waves radiated by the radiator 701A, an effect similar to changing the elevation angle of the antenna can be obtained.

Eighth Embodiment

Figure 13:
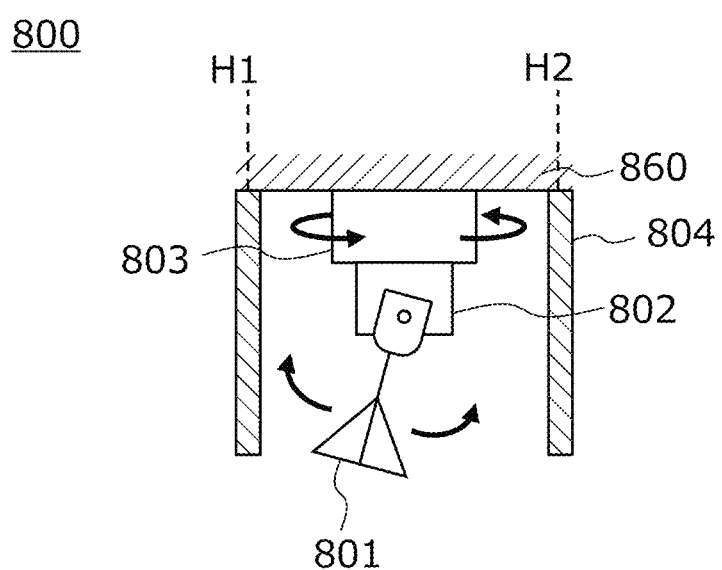
FIG. 13 is a block diagram of a microwave power transfer apparatus according to an eighth embodiment.

FIG. 13 is a diagram illustrating a configuration example of a microwave power transfer apparatus 800 as an electronic apparatus according to an eighth embodiment. The microwave power transfer apparatus 800 is mounted on a ceiling 860.

The microwave power transfer apparatus 800 is provided with an antenna 801, a mechanical elevation angle controller 802, a mechanical rotation angle controller 803, and an electromagnetic wave absorption/reflection plate 804. The antenna 801 has the same function as the antenna 101 in the first embodiment. The high-frequency device and controller (orientation controller/power controller) according to any of the first to third embodiments are provided inside the housing of at least one of the mechanical elevation angle controller 802 and the mechanical rotation angle controller 803, or in another location. The mechanical elevation angle controller 802 and the mechanical rotation angle controller 803 correspond to an actuator according to the embodiments. The orientation controller according to the present embodiment can control the elevation angle of the antenna 801 by controlling the mechanical elevation angle controller 802, and can control the azimuth angle of the antenna 801 by controlling the mechanical rotation angle controller 803. The configuration in FIG. 13 corresponds to the configuration in FIG. 9 with the addition of the electromagnetic wave absorption/reflection plate 804. Hereinafter, the description that is the same as FIG. 9 is omitted, as appropriate.

The electromagnetic wave absorption/reflection plate 804 is mounted on the ceiling 860 so as to enclose the antenna 801 from around the antenna 801. In the diagram, a cross section of the electromagnetic wave absorption/reflection plate 804 is illustrated. The electromagnetic wave absorption/reflection plate 804 absorbs or reflects electromagnetic waves radiated in the horizontal direction (90 degrees or 270 (−90 degrees)) or a neighboring direction.

In the reflection case, the electromagnetic wave absorption/reflection plate 804, which serves as a second member configured to reflect at least a portion of electromagnetic waves radiated from the antenna 801, is provided in a location including a first location H1 corresponding to a first direction (for example, the horizontal direction) that blocks leakage of the electromagnetic waves and a second location H2 opposite the first location H1. Reflected electromagnetic waves are re-reflected by the plate on the opposite side, and are repeatedly reflected thereafter until the electromagnetic waves attenuate. Alternatively, the electromagnetic waves are converted into thermal energy and attenuated by the electromagnetic wave absorption/reflection plate 804. With this arrangement, the leakage of electromagnetic waves in the horizontal direction can be mitigated.

In the absorption case, the electromagnetic wave absorption/reflection plate 804, which serves as a first member configured to absorb at least a portion of electromagnetic waves radiated from the antenna 801, is provided in the location H1 corresponding to a first direction (for example, the horizontal direction) that blocks leakage of the electromagnetic waves, in the second location H2, or both.

In the case of absorbing electromagnetic waves, the electromagnetic wave absorption/reflection plate 804 may be formed from a dielectric or magnetic body, for example, whereas in the case of reflecting electromagnetic waves, the electromagnetic wave absorption/reflection plate 804 may be formed from a metal. This configuration makes it possible to mitigate interference on another wireless system existing in the horizontal direction or a neighboring direction, regardless of the elevation angle of the antenna 801.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described before may be configured as below.

CLAUSES

Clause 1. An electronic apparatus capable of transferring power wirelessly to a power receiver apparatus, apparatus comprising:
a signal generation circuitry configured to generate a first signal for wireless power transfer;
an antenna configured to radiate an electromagnetic wave on a basis of the first signal;
an actuator capable of mechanically changing an orientation of the antenna; and
a controlling circuitry configured to control a transmission power of the first signal according to the orientation of the antenna.

Clause 2. The electronic apparatus according to clause 1, wherein
the signal generation circuitry includes at least one of a variable amplifier capable of changing a gain of the first signal and a variable attenuator capable of changing an attenuation of the first signal, and
the controlling circuitry is configured to control the transmission power of the first signal by controlling at least one of the variable amplifier and the variable attenuator.

Clause 3. The electronic apparatus according to clause 1 or 2, wherein
the signal generation circuitry includes an amplifier and a variable attenuator, and
the controlling circuitry is configured to control the transmission power of the first signal by controlling the variable attenuator.

Clause 4. The electronic apparatus according to clause 2 or 3, wherein
the controlling circuitry is configured to control the transmission power of the first signal on a basis of correspondence data associating a plurality of orientations that the antenna may take with a plurality of attenuation values or a plurality of gain values.

Clause 5. The electronic apparatus according to any one of clauses 1 to 4, wherein
the actuator is capable of changing at least an elevation angle from among an elevation angle and an azimuth angle of the antenna.

Clause 6. The electronic apparatus according to clause 5, wherein
the controlling circuitry is configured to control the transmission power of the first signal to a first power value in a case in which the elevation angle of the antenna points in a first direction, and
control the transmission power of the first signal to a second power value smaller than the first power value in a case in which the elevation angle of the antenna points in a second direction closer to a direction horizontal to an installation surface of the electronic apparatus than the first direction.

Clause 7. The electronic apparatus according to any one of clauses 1 to 6, further comprising:
a receive processing circuitry configured to perform, through the antenna, carrier sense of a second signal from another wireless system different from the power receiver apparatus, wherein
the controlling circuitry is configured to control the actuator on a basis of a result of the carrier sense.

Clause 8. The electronic apparatus according to clause 7, wherein
the receive processing circuitry is configured to compare a receive power level of the second signal to a threshold value as the carrier sense, and
the controlling circuitry is configured to change the threshold value according to the orientation of the antenna.

Clause 9. The electronic apparatus according to clause 8, wherein
when the receive power level is greater than the threshold value, the controlling circuitry is configured to control the actuator to change the orientation of the antenna, or to suspend transmission of the electromagnetic waves from the antenna.

Clause 10. The electronic apparatus according to clause 8 or 9, wherein
the receive processing circuitry is configured to use a first threshold value in a case in which the elevation angle of the antenna points in a first direction, and
use a second threshold value larger than the first threshold value in a case in which the elevation angle of the antenna points in a second direction closer to a direction horizontal to an installation surface of the electronic apparatus than the first direction.

Clause 11. The electronic apparatus according to clause 5 or 6, wherein
the actuator is capable of changing the elevation angle of the antenna by moving the antenna along a concave rail.

Clause 12. The electronic apparatus according to clause 5, 6 or 11, wherein
the actuator includes a robot arm having one end connected to a base,
the antenna is connected to another end of the robot arm, and
the actuator is capable of changing the elevation angle of the antenna by driving the robot arm.

Clause 13. The electronic apparatus according to clause 5, 6, 11 or 12 wherein
the actuator is capable of changing the azimuth angle of the antenna by rotating a support supporting the antenna.

Clause 14. The electronic apparatus according to any one of clauses 1 to 13, wherein
the antenna is provided with a radiator configured to radiate the electromagnetic waves and a reflector configured to reflect the electromagnetic waves radiated from the radiator, and
the antenna is capable of changing a direction in which the electromagnetic waves are reflected by moving the reflector relative to the radiator.

Clause 15. The electronic apparatus according to any one of clauses 1 to 14, wherein
a first member capable of absorbing at least a portion of electromagnetic waves radiated from the antenna is provided in a location corresponding to a first direction that blocks leakage of the electromagnetic waves.

Clause 16. The electronic apparatus according to any one of clauses 1 to 15, wherein
a second member capable of reflecting at least a portion of electromagnetic waves radiated from the antenna is provided in a location including a first location corresponding to a first direction that blocks leakage of the electromagnetic waves and a second location opposite the first location.

Clause 17. The electronic apparatus according to any one of clauses 1 to 16, wherein
the controlling circuitry is configured to control the transmission power of the first signal on a basis of maximum output characteristics stipulating a maximum output value that the antenna may take in each elevation angle direction.

Clause 18. The electronic apparatus according to clause 17, wherein
the maximum output value of a radiation level of the electromagnetic waves in a direction horizontal to an installation surface of the electronic apparatus is less than or equal to $1/100$ a maximum radiation level of the antenna.

Clause 19. A wireless power transfer method of transferring power wirelessly to a power receiver apparatus, comprising:
mechanically changing an orientation of an antenna relative to the power receiver apparatus;
determining a transmission power of a first signal for the wireless power transfer according to the orientation of the antenna;
generating the first signal on a basis of the transmission power; and
radiating electromagnetic waves from the antenna on a basis of the first signal.

Clause 20. A wireless power transfer system comprising:
a power receiver apparatus;
a signal generation circuitry configured to generate a first signal for wireless power transfer to the power receiver apparatus;
an antenna configured to radiate electromagnetic waves on a basis of the first signal;
an actuator capable of mechanically changing an orientation of the antenna; and
a power control circuit configured to control a transmission power of the first signal according to the orientation of the antenna.

The invention claimed is:

1. An electronic apparatus capable of transferring power wirelessly to a power receiver apparatus, apparatus comprising:
a signal generation circuitry configured to generate a first signal for wireless power transfer;
an antenna configured to radiate an electromagnetic wave;
an actuator capable of mechanically changing an orientation of the antenna, the orientation being changeable at least between a first orientation and a second orientation, the first orientation corresponding to a direction horizontal to an installation surface of the electronic apparatus and the second orientation corresponding to a direction vertical to the installation surface of the electronic apparatus;
at least one of a variable amplifier capable of changing a gain of the first signal and a variable attenuator capable of changing an attenuation of the first signal;
a memory configured to store correspondence data associating a plurality of orientations that the antenna may take with a plurality of attenuation values or a plurality of gain values, the plurality of orientations including the first orientation and the second orientation, and the correspondence data being configured such that the transmission power increases as the orientation of the antenna becomes closer from the first orientation to the second orientation; and
a controlling circuitry configured to control the transmission power of the electromagnetic wave according to the orientation of the antenna by controlling at least one of the variable amplifier or the variable attenuator on the basis of the correspondence data.

2. The electronic apparatus according to claim 1, wherein the signal generation circuitry includes an amplifier and a variable attenuator, and
the controlling circuitry is configured to control the transmission power of the electromagnetic wave by controlling the variable attenuator.

3. The electronic apparatus according to claim 1, wherein the actuator is capable of changing at least an elevation angle from among an elevation angle and an azimuth angle of the antenna.

4. The electronic apparatus according to claim 3, wherein the controlling circuitry is configured to control the transmission power of the first signal to a first power value in a case in which the elevation angle of the antenna points in a first direction, and
control the transmission power of the first signal to a second power value smaller than the first power value in a case in which the elevation angle of the antenna points in a second direction closer to a direction horizontal to an installation surface of the electronic apparatus than the first direction.

5. The electronic apparatus according to claim 3, wherein the actuator is capable of changing the elevation angle of the antenna by moving the antenna along a concave rail.

6. The electronic apparatus according to claim 3, wherein the actuator includes a robot arm having one end connected to a base,
the antenna is connected to another end of the robot arm, and
the actuator is capable of changing the elevation angle of the antenna by driving the robot arm.

7. The electronic apparatus according to claim 3, wherein the actuator is capable of changing the azimuth angle of the antenna by rotating a support supporting the antenna.

8. The electronic apparatus according to claim 1, further comprising:
a receive processing circuitry configured to perform, through the antenna, carrier sense of a second signal from another wireless system different from the power receiver apparatus, wherein
the controlling circuitry is configured to control the actuator on a basis of a result of the carrier sense.

9. The electronic apparatus according to claim 8, wherein the receive processing circuitry is configured to compare a receive power level of the second signal to a threshold value as the carrier sense, and
the controlling circuitry is configured to change the threshold value according to the orientation of the antenna.

10. The electronic apparatus according to claim 9, wherein
when the receive power level is greater than the threshold value, the controlling circuitry is configured to control the actuator to change the orientation of the antenna, or to suspend transmission of the electromagnetic waves from the antenna.

11. The electronic apparatus according to claim 9, wherein
the receive processing circuitry is configured to use a first threshold value in a case in which the elevation angle of the antenna points in a first direction, and use a second threshold value larger than the first threshold value in a case in which the elevation angle of the antenna points in a second direction closer to a direction horizontal to an installation surface of the electronic apparatus than the first direction.

12. The electronic apparatus according to claim 1, wherein
the antenna is provided with a radiator configured to radiate the electromagnetic waves and a reflector configured to reflect the electromagnetic waves radiated from the radiator, and
the antenna is capable of changing a direction in which the electromagnetic waves are reflected by moving the reflector relative to the radiator.

13. The electronic apparatus according to claim 1, wherein
a first member capable of absorbing at least a portion of electromagnetic waves radiated from the antenna is provided in a location corresponding to a first direction that blocks leakage of the electromagnetic waves.

14. The electronic apparatus according to claim 1, wherein
a second member capable of reflecting at least a portion of electromagnetic waves radiated from the antenna is provided in a location including a first location corresponding to a first direction that blocks leakage of the electromagnetic waves and a second location opposite the first location.

15. The electronic apparatus according to claim 1, wherein
the controlling circuitry is configured to control the transmission power of the first signal on a basis of maximum output characteristics stipulating a maximum output value that the antenna may take in each elevation angle direction.

16. The electronic apparatus according to claim 15, wherein
the maximum output value of a radiation level of the electromagnetic waves in a direction horizontal to an installation surface of the electronic apparatus is less than or equal to $\frac{1}{100}$ a maximum radiation level of the antenna.

17. A wireless power transfer method of transferring power wirelessly to a power receiver apparatus, comprising:
mechanically changing an orientation of an antenna relative to the power receiver apparatus, the orientation being changeable at least between a first orientation and a second orientation, the first orientation corresponding to a direction horizontal to an installation surface of a power transfer apparatus and the second orientation corresponding to a direction vertical to the installation surface of the power transfer apparatus;
determining a transmission power of an electromagnetic wave for the wireless power transfer according to the orientation of the antenna;
generating a first signal on a basis of the transmission power;
radiating the electromagnetic wave from the antenna;
controlling the transmission power of the electromagnetic wave according to the orientation of the antenna by controlling at least one of a variable amplifier capable of changing a gain of the first signal and a variable attenuator capable of changing an attenuation of the first signal;
storing, in a memory, correspondence data associating a plurality of orientations that the antenna may take with a plurality of attenuation values or a plurality of gain values, and the correspondence data being configured such that the transmission power increases as the orientation of the antenna becomes closer from the first orientation to the second orientation; and
controlling the transmission power of the on a basis of the correspondence data.

* * * * *